US010580009B2

(12) United States Patent
Snyder et al.

(10) Patent No.: US 10,580,009 B2
(45) Date of Patent: *Mar. 3, 2020

(54) MOBILE COMMUNICATIONS MESSAGE VERIFICATION OF FINANCIAL TRANSACTIONS

(71) Applicant: Visa International Service Association, San Francisco, CA (US)

(72) Inventors: Randall A. Snyder, Las Vegas, NV (US); Thomas S. Ginter, Bellevue, WA (US)

(73) Assignee: Visa International Service Association, San Francisco, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/783,488

(22) Filed: Oct. 13, 2017

(65) Prior Publication Data

US 2018/0053191 A1 Feb. 22, 2018

Related U.S. Application Data

(63) Continuation of application No. 13/387,991, filed as application No. PCT/US2010/044019 on Jul. 30, 2010, now Pat. No. 9,818,121.

(Continued)

(51) Int. Cl.
*G06F 15/16* (2006.01)
*G06Q 20/42* (2012.01)
(Continued)

(52) U.S. Cl.
CPC ....... *G06Q 20/425* (2013.01); *G06Q 20/3224* (2013.01); *G06Q 20/401* (2013.01); *G06Q 20/42* (2013.01)

(58) Field of Classification Search
None
See application file for complete search history.

(56) References Cited

U.S. PATENT DOCUMENTS

| 5,878,337 A | 3/1999 | Joao et al. |
| 6,612,488 B2 | 9/2003 | Suzuki |

(Continued)

FOREIGN PATENT DOCUMENTS

| GB | 2469025 | 10/2010 |
| WO | 9847116 | 10/1998 |

(Continued)

OTHER PUBLICATIONS

ISR / Written Opinion dated Oct. 4, 2010, in PCT Application No. PCT/US2010/44019, 6 pages.

(Continued)

*Primary Examiner* — Michael A Keller
*Assistant Examiner* — Jsing Forng Lin
(74) *Attorney, Agent, or Firm* — Kilpatrick Townsend & Stockton LLP

(57) ABSTRACT

A system and method for verifying a secure transaction by evaluating the transaction, generating a first verification value for the transaction, sending an electronic mobile message to a wireless device associated with the transaction, receiving a response from the wireless device to the electronic mobile message associated with the transaction and generating a new second verification value for the transaction based on the response is provided. The second verification value may be used to validate or invalidate the secure transaction.

18 Claims, 11 Drawing Sheets

Related U.S. Application Data

(60) Provisional application No. 61/230,628, filed on Jul. 31, 2009.

(51) Int. Cl.
*G06Q 20/40* (2012.01)
*G06Q 20/32* (2012.01)

(56) References Cited

U.S. PATENT DOCUMENTS

| | | |
|---|---|---|
| 6,832,721 B2 | 12/2004 | Fujii |
| 6,868,391 B1 | 3/2005 | Hultgren |
| 6,913,194 B2 | 7/2005 | Suzuki |
| 6,948,656 B2 | 9/2005 | Williams |
| 7,104,444 B2 | 9/2006 | Suzuki |
| 7,152,788 B2 | 12/2006 | Williams |
| 7,221,949 B2 | 5/2007 | Clough |
| 7,376,431 B2 | 5/2008 | Niedermeyer |
| 7,500,607 B2 | 3/2009 | Williams |
| 7,503,489 B2 | 3/2009 | Heffez et al. |
| 7,509,117 B2 | 3/2009 | Yum |
| 7,594,605 B2 | 9/2009 | Aaron et al. |
| 7,600,676 B1 | 10/2009 | Rados et al. |
| 7,606,560 B2 | 10/2009 | Labrou et al. |
| 7,669,759 B1 | 3/2010 | Zettner |
| 7,684,809 B2 | 3/2010 | Niedermeyer |
| 7,697,942 B2 | 4/2010 | Stevens |
| 7,743,981 B2 | 6/2010 | Williams |
| 7,747,535 B2 | 6/2010 | Mikan et al. |
| 7,752,135 B2 | 7/2010 | Brown et al. |
| 7,941,835 B2 | 5/2011 | Wolfond et al. |
| 8,116,731 B2 | 2/2012 | Buhrrmann et al. |
| 8,135,624 B1 | 3/2012 | Ramalingam et al. |
| 8,140,403 B2 | 3/2012 | Ramalingam et al. |
| 8,166,068 B2 | 4/2012 | Stevens |
| 8,190,087 B2 | 5/2012 | Fisher et al. |
| 8,255,284 B1 | 8/2012 | Ramalingam et al. |
| 8,280,348 B2 | 10/2012 | Snyder et al. |
| 8,285,639 B2 | 10/2012 | Eden et al. |
| 8,315,947 B2 | 11/2012 | Aaron et al. |
| 8,341,029 B1 | 12/2012 | Ramalingam et al. |
| 8,374,634 B2 | 2/2013 | Dankar et al. |
| 8,401,906 B2 | 3/2013 | Ruckart |
| 8,521,629 B2 | 8/2013 | Abifaker |
| 8,588,748 B2 | 11/2013 | Buhrrman et al. |
| 8,615,465 B2 | 12/2013 | Boutcher et al. |
| 8,632,002 B2 | 1/2014 | Boutcher et al. |
| 8,831,564 B2 | 9/2014 | Ferguson et al. |
| 8,839,394 B2 | 9/2014 | Dennis et al. |
| 8,924,295 B2 | 12/2014 | Aaron et al. |
| 9,154,952 B2 | 10/2015 | Dennis et al. |
| 9,185,123 B2 | 11/2015 | Dennis et al. |
| 9,420,448 B2 | 8/2016 | Dankar et al. |
| 9,456,348 B2 | 9/2016 | Dennis et al. |
| 9,818,121 B2 | 11/2017 | Snyder et al. |
| 2002/0108062 A1 | 8/2002 | Nakajima et al. |
| 2003/0004827 A1 | 1/2003 | Wang |
| 2003/0135463 A1 | 7/2003 | Brown et al. |
| 2004/0122685 A1 | 6/2004 | Bunce |
| 2005/0150945 A1 | 7/2005 | Choi |
| 2005/0278542 A1 | 12/2005 | Pierson et al. |
| 2007/0055785 A1 | 3/2007 | Stevens |
| 2007/0174082 A1 | 7/2007 | Singh |
| 2007/0255662 A1 | 11/2007 | Tumminaro |
| 2008/0046367 A1 | 2/2008 | Billmaier et al. |
| 2008/0172340 A1 | 7/2008 | Karlsson |
| 2008/0177659 A1 | 7/2008 | Lacey et al. |
| 2008/0182551 A1 | 7/2008 | Lovell |
| 2008/0222038 A1 | 9/2008 | Eden et al. |
| 2008/0294556 A1 | 11/2008 | Anderson |
| 2010/0274572 A1 | 10/2010 | Hammad et al. |
| 2011/0208601 A1 | 8/2011 | Ferguson et al. |
| 2011/0238564 A1 | 9/2011 | Lim et al. |
| 2012/0130898 A1 | 5/2012 | Snyder et al. |
| 2012/0131121 A1 | 5/2012 | Snyder et al. |
| 2012/0259784 A1 | 10/2012 | Carlson et al. |
| 2013/0197998 A1 | 8/2013 | Buhrmann et al. |
| 2013/0262311 A1 | 10/2013 | Buhrmann et al. |
| 2014/0040155 A1 | 2/2014 | Buhrmann et al. |
| 2014/0187205 A1 | 7/2014 | Dankar et al. |
| 2015/0017947 A1 | 1/2015 | Ferguson et al. |
| 2015/0142623 A1 | 5/2015 | Ferguson et al. |
| 2015/0178715 A1 | 6/2015 | Buhrmann et al. |
| 2016/0227405 A1 | 8/2016 | Dennis et al. |

FOREIGN PATENT DOCUMENTS

| | | |
|---|---|---|
| WO | 2005073934 | 8/2005 |
| WO | 2009009872 | 1/2009 |

OTHER PUBLICATIONS

Supplementary European Search Report, dated Oct. 29, 2014, in European Patent Application No. EP 10805148.3, 7 pages.

MOBILE COMMUNICATIONS MESSAGE VERIFICATION OF FINANCIAL TRANSACTIONS

CROSS REFERENCE TO RELATED APPLICATIONS

This patent application is a continuation of U.S. application Ser. No. 13/387,991, filed Jan. 30, 2012, which is a 371 of PCT Application No. PCT/US2010/044019, filed Jul. 30, 2010, which claims the benefit of U.S. Provisional Patent Application Ser. No. 61/230,628 filed Jul. 31, 2009, and entitled, "Short-Message Service Verification of Financial Transactions," which are hereby incorporated by reference in is their entirety for all purposes.

PCT Application No. PCT/US2010/044019, filed Jul. 30, 2010 is a continuation-in-part application of, and claims the benefit of, the following six applications, each of which are hereby incorporated by reference in their entirety:

1. U.S. application Ser. No. 11/933,803, entitled "System and Method for Automated Analysis Comparing a Wireless Device Location with Another Geographic Location," by Dankar et al., filed Nov. 1, 2007, which claims the benefit of U.S. Provisional Application Ser. No. 60/979,663, entitled "Method for Tracking Credit Card Fraud," by Dankar et al., filed Oct. 12, 2007; U.S. Provisional Application Ser. No. 60/909,718, entitled "System and Method for Authenticating an Online E-commerce Transaction Using the Location of a Mobile Device and the Location of the Internet Protocol Connection," by Reddy et al., filed Apr. 3, 2007; and U.S. Provisional Application Ser. No. 60/895,144, entitled "System and Method for Authenticating a Financial Banking Transaction Using the Location of a Mobile Device," by Reddy et al., filed Mar. 16, 2007.

2. U.S. application Ser. No. 12/332,878, entitled "System and Method for Mobile Identity Protection of a User of Multiple Computer Applications, Networks or Devices Using A Wireless Device," (as amended) by Buhrmann et al., filed Dec. 11, 2008, which claims the benefit of U.S. Provisional Application Ser. No. 61/058,621, entitled "System and Method for Authenticating a User of Multiple Computer Applications, Networks, or Devices via a Wireless Device," by Buhrmann et al., filed Jun. 4, 2008; and U.S. Provisional Application Ser. No. 61/027,892, entitled "System and Method for Wireless Device Based Online User Authentication," by Dennis et al., filed Feb. 12, 2008. U.S. application Ser. No. 12/332,878 is a continuation-in-part application of, and claims the benefit of, U.S. application Ser. No. 11/933,803.

3. U.S. application Ser. No. 12/343,015, entitled "System and Method For Wireless Device Based Online User Authentication," by Dennis et al., filed Dec. 23, 2008, which claims the benefit of U.S. Provisional Application Ser. No. 61/027,892, entitled "System and Method for Wireless Device Based Online User Authentication," by Dennis et al., filed Feb. 12, 2008.

4. U.S. application Ser. No. 12/466,355, entitled "System and Method For Mobile Identity Protection to Authenticate a User of a Computer Application, Network, or Device Using a Wireless Device," by Boyle et al., filed May 14, 2009, which claims the benefit of U.S. Provisional Application Ser. No. 61/053,152, entitled "System and Method for Authenticating a User of Multiple Computer Applications, Networks, or Devices via a Wireless Device," by Boyle et al., filed May 14, 2008.

5. U.S. application Ser. No. 12/628,051, entitled, "System and Method for Identity Protection Using a Mobile Device Signaling Network Derived Location Pattern Recognition," by Ferguson et al., filed Nov. 30, 2009, which claims the benefit of U.S. Provisional Application Ser. No. 61/167,111, entitled "System and Method for Signaling Network Derived Location Pattern Recognition," by Ferguson et al., filed Apr. 6, 2009.

6. International Application Ser. No. PCT/US10/41264, entitled "Mobile Directory Number and Email Verification of Financial Transactions," by Snyder et al., filed Jul. 7, 2010, which claims the benefit of U.S. Provisional Application Ser. No. 61/223,671, entitled "Mobile Directory Number Verification of Financial Transactions," by Snyder et al., filed Jul. 7, 2009; and U.S. Provisional Application Ser. No. 61/223,677, entitled "Email Verification of Financial Transactions," by Snyder et al., filed Jul. 7, 2009.

FIELD OF THE INVENTION

This invention relates generally to verification of financial transactions and more particularly to electronic verification of financial transactions based on a mobile communications message.

BACKGROUND OF THE INVENTION

There are many methods that provide for authentication, verification and validation of user activity as well as for user identity. These technologies are used to ensure that an individual is the actual person claimed for the benefit of the activity or transaction. Today, many technologies have greatly reduced fraudulent transactions, but instances of fraudulent activity still occur. These technologies are employed, for instance, when an individual engages in some transaction that requires some degree of security. An automated financial transaction is a common example of a secure transaction requiring mechanisms to authenticate, verify and validate the identity of the individual attempting to perform the transactional activity. Primary examples of such transactions include accessing automated teller machines (ATMs) to obtain money or to perform some other banking function and the use of credit or debit cards at a point of sale (POS) to make a purchase. Even electronic commerce-based transactions (e-commerce) and online banking, where an individual enters financial information into a website form on a personal computer to make a purchase or to perform a financial activity, require some form of authentication, verification and validation. Typical means to authenticate individuals attempting a secure transaction include use of personal identification numbers (PINS) or some other type of information that is assumed to be known only by an authorized user involved in the transaction. Other means of documentation may also be used to verify identity, such as a driver's license or other form of photo identification. Even the use of biometric devices, such as fingerprint scanners, may be used to authenticate an individual attempting to perform a secure transaction. However, even with these and many other technologies, fraudulent activity still occurs and identity theft and misrepresentation remains a problem.

In addition, many existing fraud detection and prevention technologies are problematic because they provide a false positive indication of fraudulent activity in some circumstances. In addition to the fraud detection and prevention mechanisms already mentioned, other technologies may be employed such as behavioral profiling which is used to detect anomalous behavior. These technologies apply algorithms to analyze past user behavior when a user attempts to engage in some activity or transaction that is similar to a previous activity or transaction. If the individual's behavior when engaging in a secure activity is not consistent with that individual's past behavior, a likelihood of fraudulent activity may be deduced. Common examples of this situation are when an individual uses a credit card to purchase some product or service in a foreign country where they have never previously performed a similar transaction or when the amount of a particular transaction is significantly different from any previous transaction. This behavior may appear to be anomalous to a fraud detection system and the activity or transaction being performed may be terminated before any potential fraud is perpetrated. If this determination is a false positive indication and the individual is actually an authorized user, the user suffers the consequences of a failed transaction and the service provider is perceived to have provided a poor quality of service. Additionally, debit or credit cards may be stolen, PINS may become compromised and information meant to be held only by authorized users may become known to others which limits the effectiveness of some current fraud prevention technologies.

SUMMARY OF THE INVENTION

In an example embodiment, a system and its methods of use verify a secure transaction based on information derived from a data network and a wireless device ID such as a mobile directory number (MDN) associated with the secure transaction event. An example method includes evaluating the secure transaction using a mobile identity verification system to generate an initial first verification value, sending an electronic mobile message to a wireless device associated with the wireless device ID, receiving an electronic message response from the wireless device and re-evaluating the transaction based on that response to generate a new second verification value. Various embodiments relate generally to protecting the identity of individuals and detecting identity theft by sending a mobile message to an individual's wireless device using the wireless device ID (e.g. MDN) associated with a secure transaction and, based on the response to the mobile message, further evaluating the validity of the secure transaction and sending the new second verification value to a transaction processor where such value may be used for a variety of applications, such as assisting in the detection and prevention of identity theft, fraudulent behavior or electronic activity that may be engaged in by an individual.

In another example embodiment, the electronic mobile message is a short message service (SMS) message.

In an additional example embodiment, the electronic mobile message is a multimedia message service (MMS) message.

In yet another example embodiment, the electronic mobile message is an email message.

In a further example embodiment, the electronic mobile message is an instant message (IM).

In an additional example embodiment, the electronic mobile message is a mobile data message.

In still another example embodiment, an action is performed based on the second verification value including displaying the second verification value to a user on a computerized device so that a transaction can be verified or rejected.

In yet another example embodiment, performing an action based on the second verification value includes automatically approving or rejecting a transaction based on the second verification value.

By analyzing the response to a mobile message sent to a wireless device, a re-evaluated, or new, second verification value can be derived using statistical models and used to determine a probability that an individual associated with a particular wireless device is engaged in either some usual and regular behavior or potentially irregular or anomalous behavior. Irregular or anomalous behavior may be an indication that identity theft has occurred and probabilistic techniques and models to determine incidents of identity theft may be used to detect whether identity theft has occurred.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
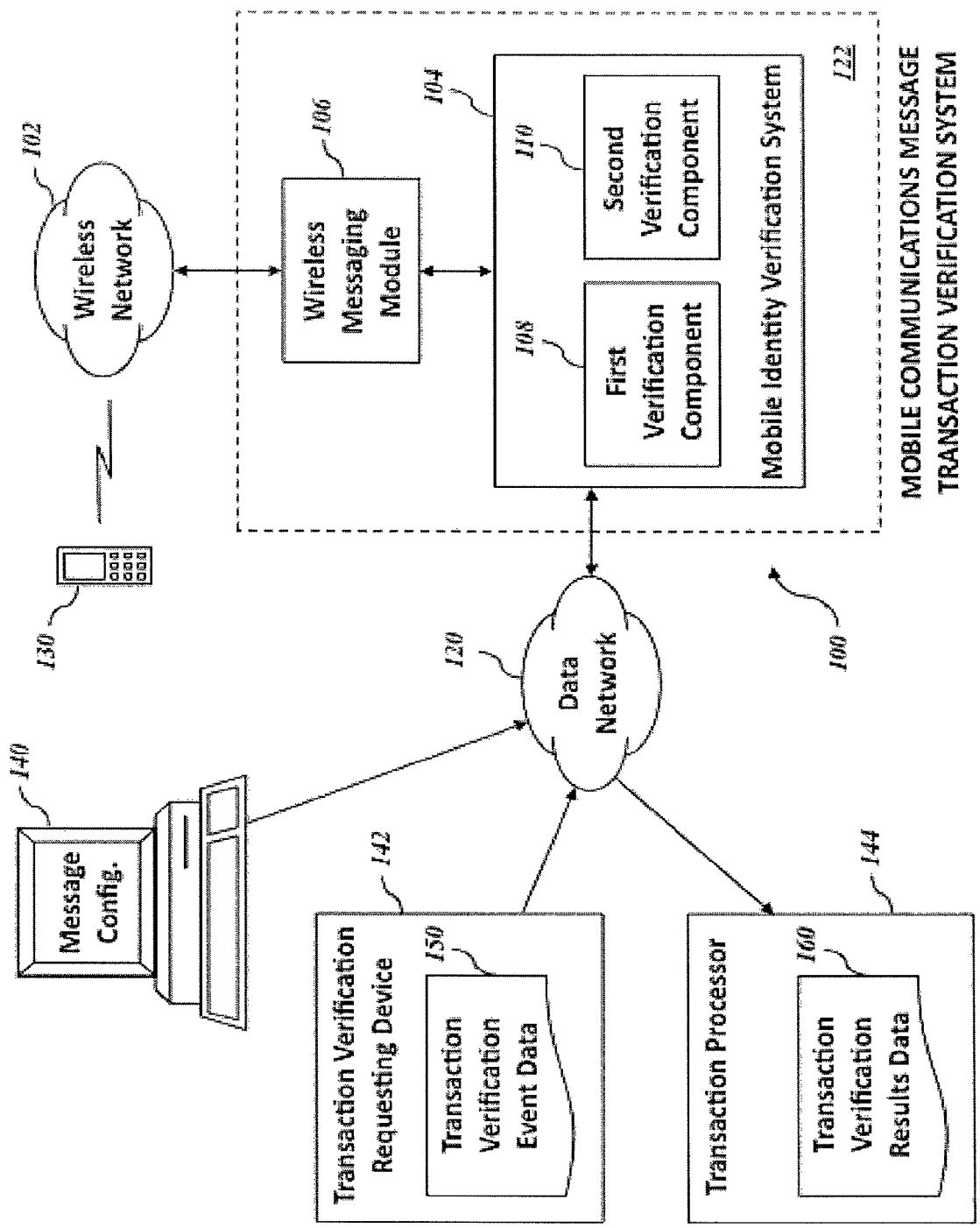
FIG. 1 is a block diagram showing an operating environment of an exemplary mobile communications message transaction verification system formed in accordance with an embodiment of the present invention.

FIG. 1 is a block diagram showing an example operating environment of a mobile communications message transaction verification system 100. The transaction verification system 100 is in signal communication with a wireless network 102 and includes a mobile identity verification system 104 in data communication with a wireless messaging module 106 in an example embodiment. The mobile identity verification system 104 includes a first verification component 108 and a second verification component 110. The mobile identity verification system 104 is in signal communication with a data network 120. A wireless device 130 is in signal communication with the wireless network 102, allowing communication between the wireless messaging module 106 and the wireless device 130. A message configuration computerized device 140, a transaction verification requesting device 142, and a transaction processor 144 are in signal communication with the data network 120, allowing for communication with the mobile identity verification system 104.

In an example embodiment, the transaction verification requesting device 142 sends transaction verification event data 150 to the mobile identity verification system 104 over the data network 120 and the transaction processor 144 receives transaction verification results data 160 from the mobile identity verification system 104 over the data network 120. Although the transaction verification requesting device 142 and the transaction processor 144 are shown as being separate in FIG. 1, in other embodiments, the same electronic device may include both the transaction verification requesting device 142 and the transaction processor 144. Embodiments of the transaction verification system 100, based upon information received from the data network 120, the wireless network 102, transaction verification event data 150, and optionally other information assess the likelihood that a transaction is fraudulent.

Examples of transactions that may cause transaction verification event data 150 to be passed to the transaction verification system 100 via the data network 120 include the purchase of a product or service using a credit card or the like, where the product or service is purchased by an account holder at a particular location (point of purchase) or at a remote location (such as a "mail order" purchase, "telephone order" purchase or purchase from an Internet website). Point of purchase transactions may include, for example, use of a debit card or credit card to obtain cash from an automatic teller machine (ATM) or use of a debit card or credit card to purchase products or services at a point of sale employing an electronic point of sale terminal. Embodiments of the transaction verification system 100 may be configured to provide an assessment of the likelihood of fraud for any type of transaction.

In accordance with some examples of the present invention, a method of verifying a transaction includes configuring electronic mobile message criteria enabling the transaction verification system 100 to determine for which circumstances an electronic mobile message (e.g. transaction verification message) is to be sent to a wireless device to verify a secure transaction of interest. The message configuration criteria may include information such as a threshold first verification value level before an electronic mobile message is sent to a wireless device, for example. In an example embodiment, the message configuration computerized device 140 shown in FIG. 1 may be used to provide a message configuration using a graphical user interface (GUI). However, in other embodiments, an automated process of providing message configuration information to the transaction verification system 100 may be used. The GUI may allow manual message entry, default message content may be provided on a form presented in the GUI, a user may modify the default message content, enter one or more MDNs, enter a timeout value and enter verification value threshold criteria used to determine when a transaction verification message is sent.

The GUI running on the message configuration computerized device 140 may also be used to present received response data on a display in an example embodiment. The GUI may display an MDN, message response content, time-stamp when the message response was received, the second generated verification value based on the mobile identity verification system 104 process, whether the transaction verification message was confirmed or not, a "no message response" indication, a "message response timeout indication" and/or an "irregular message response" indication.

Also in accordance with some examples of the present invention, a method of verifying a transaction includes: receiving transaction verification event data 150 as a mobile identity transaction verification request via the data network 120 at the computerized mobile identity verification system 104, the mobile identity verification request including a unique wireless device ID such as a mobile directory number (MDN), for example, and a transaction location; evaluating the transaction with the first verification component 108 based on the MDN and the transaction location to generate a first verification value; sending an electronic mobile message (e.g. a transaction verification message) to the MDN associated with the wireless device 130 across the wireless network 102 via the wireless messaging module 106; receiving a response to the electronic mobile message from the wireless device 130 associated with the MDN via the wireless messaging module 106 at the mobile identity verification system 104; re-evaluating the transaction with the second verification component 110 based on the response to generate a second verification value; electronically sending the second verification value to a transaction processor as transaction verification results data 160 via the data network 120; and performing an action based on the new second verification value. Although the first calculated verification value for a transaction of interest may change to a second verification value when re-evaluated, the first verification value may remain the same in some particular circumstances, such as if a transaction verification message response is not received, for example. In this case, the first verification value rather than the second verification value may be sent to the transaction processor 144.

One skilled in the arts may appreciate that the electronic mobile message (e.g. transaction verification message) may be of the form of any type of electronic mobile communications message. Non-limiting examples of the types of electronic mobile communications message that may perform as the transaction verification message are:

Short message service (SMS) message;
Multimedia message service (MMS) message;
Email message;
Instant message (IM);
Mobile data message using any typical data communications protocol such as the Hypertext Transport Protocol (HTTP), Unstructured Supplementary Service Data (USSD), etc.

Figure 9:
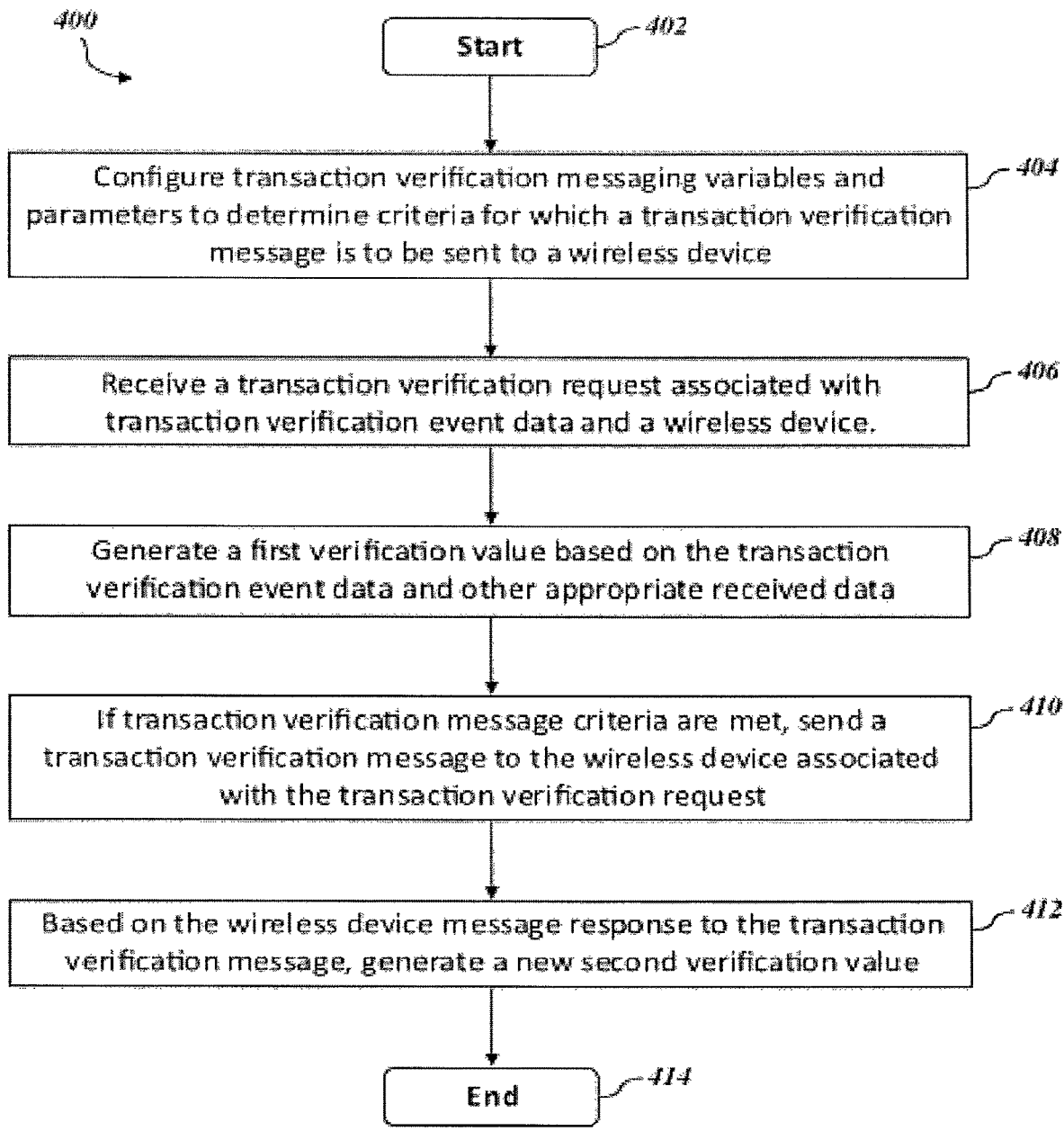
FIG. 9 is an exemplary information flow chart disclosing operation of an embodiment of the mobile communications message transaction verification system.

As discussed further with respect to FIG. 9, it should be understood that the mobile communications message transaction verification system 100 shown in FIG. 1 can be implemented using a computer system 122 having at least one processor, at least one memory component in signal communication with the processor, and at least one communications interface in signal communication with the processor. The mobile identity verification system 104 and the wireless messaging module 106 can be stored in the memory, for example. Programming instructions can also be stored in memory that when run by the processor cause the processor to be configured to implement the functions of the mobile identity verification system 104 and the wireless messaging module 106. In some embodiments, the mobile identity verification system 104 and the wireless messaging module 106 can be implemented with different processors. The communications interface can allow the processor to communicate with the wireless network 102 when running the processes of the wireless messaging module 106. The communications interface can also allow the processor to receive transaction verification event data 150 from a secure transaction event and to send verification values to other systems. The verification values can be sent to systems that triggered a secure transaction event or to other systems. In some embodiments, more than one communications interface can be used. It should also be understood that the mobile communications message transaction verification system 100 can be implemented in a distributed manner using a plurality of computer systems 122.

Figure 2:
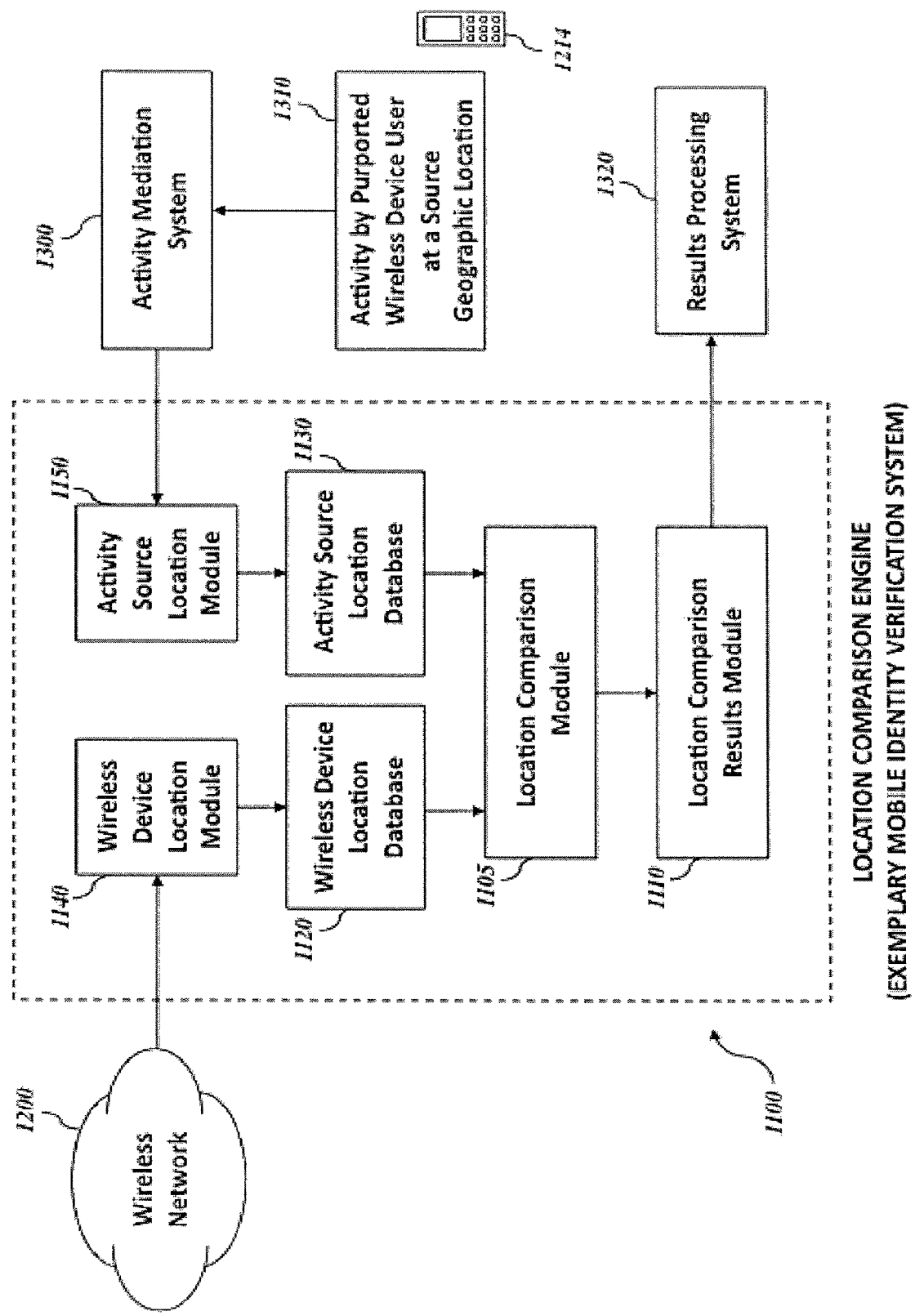
FIG. 2 is a block diagram depicting the functional entities and modules of an exemplary first verification component which is shown as a location comparison engine used to calculate and provide a first verification value.
Figure 3:
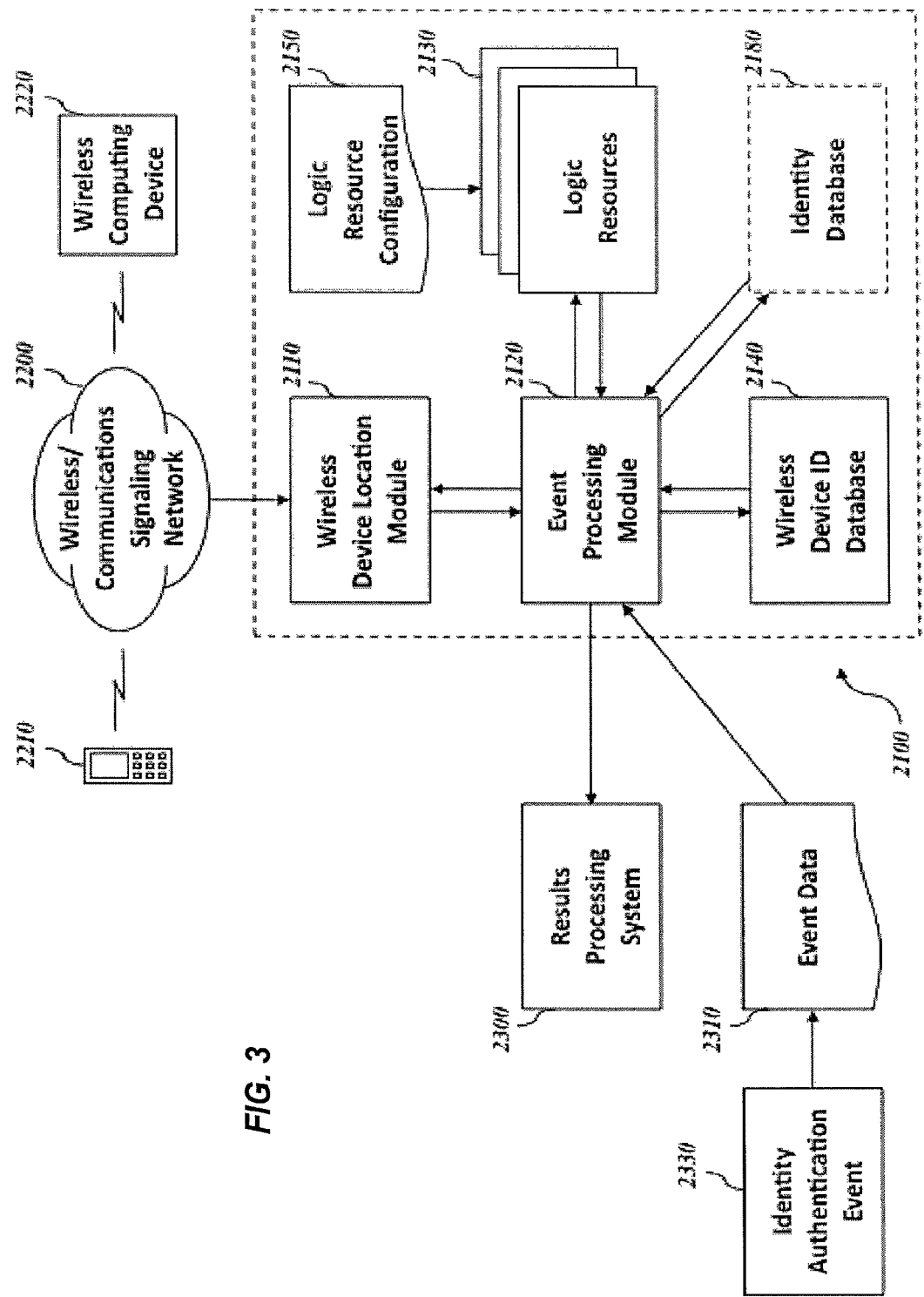
FIG. 3 is a block diagram depicting the functional entities and modules of an exemplary first verification component which is shown as an identity register used to calculate and provide a first verification value.
Figure 4:
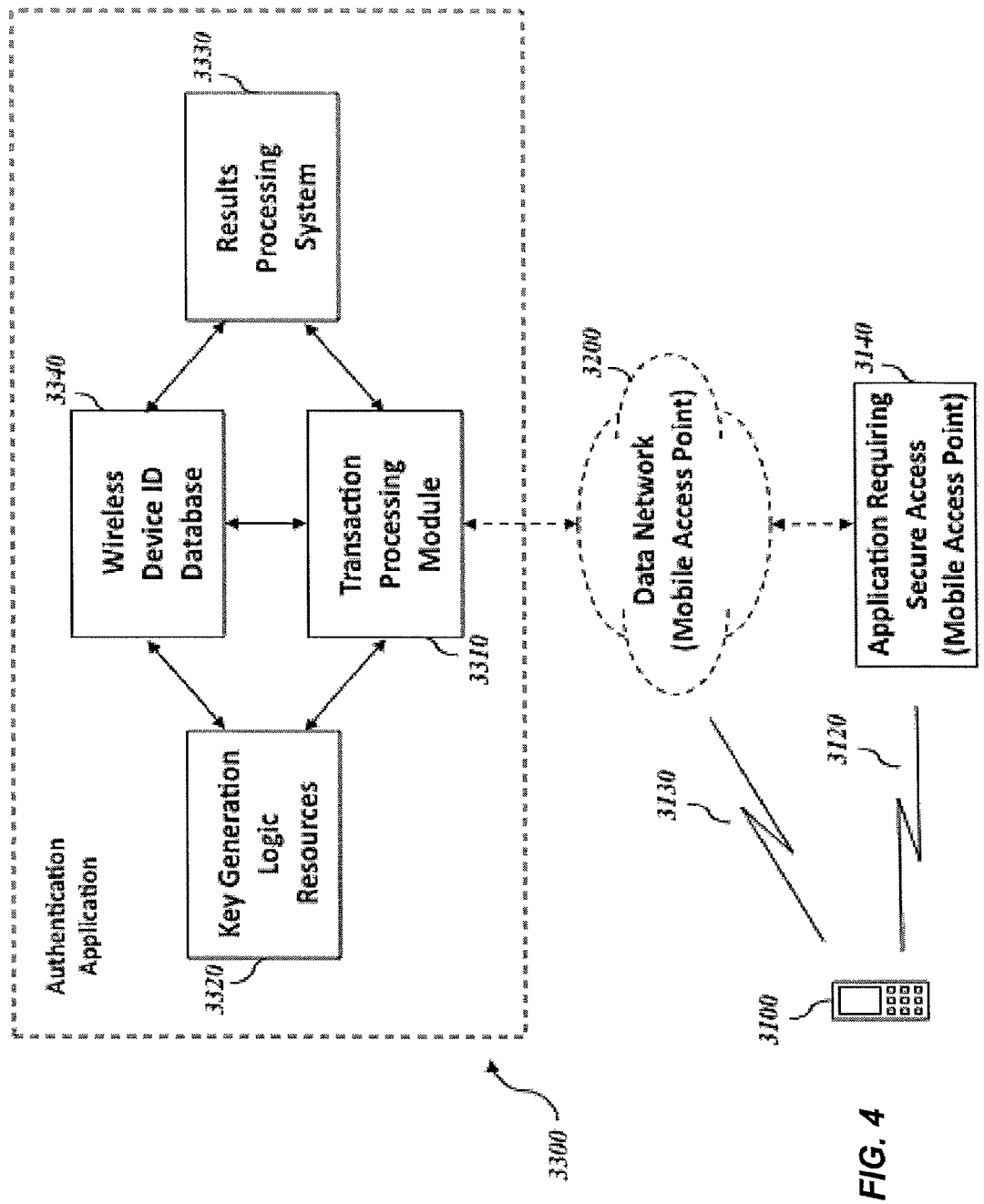
FIG. 4 is a block diagram depicting the functional entities and modules of an exemplary first verification component which is shown as a wireless device based user authentication system used to calculate and provide a first verification value (i.e. an authentication result) for an application requiring secure access.

The exemplary first verification component 108 may be represented by one or more of the following embodiments:
Location Comparison Engine (FIG. 2, 1100);
Identity Register (FIG. 3, 2100);
Wireless Device Based User Authentication (FIG. 4, 3300);
Signaling Network Derived Location Pattern Recognition System (FIG. 5, 4100); and
Mobile Directory Number and Email Transaction Verification System (FIG. 6, 5100).

FIG. 2 is an example embodiment of the first verification component 108 which is shown as a location comparison engine 1100. One embodiment of the location comparison engine 1100 includes a wireless device location module 1140, an activity source location module 1150, a wireless device location database 1120, an activity source location database 1130, a location comparison module 1100, and a location comparison results module 1110.

The location comparison module 1100 compares location information that is obtained from both a wireless network 1200 and an activity mediation system 1300 and subsequently passed to this module from both the wireless device location database 1120 and the activity source location database 1130. The wireless network 1200 provides location information for a wireless device 1214 and the activity mediation system 1300 provides location information from some activity by the purported wireless device user at a source geographic location 1310. If the location comparison results demonstrate close proximity of the user to the application being accessed or the activity being performed, a reasonable assertion may be made that the user is authentic, or the activity being performed is valid. In contrast, if the location comparison results demonstrate far proximity of the user to the application being accessed or the activity being performed, a reasonable assertion may be made that the user is not authentic, or the activity being performed is invalid. A result is generated based on the comparison at the location comparison results module 1110. In this example embodiment, the result generated at the location comparison results module is the first verification value generated by the transaction verification system 100. Results of the location comparison are sent from the location comparison results module 1110 to a results processing system 1320 that includes the second verification component 110 shown in FIG. 1 in an example embodiment. The results processing system 1320 may then apply the location comparison results to an application that is being used by the wireless device user 1310. The results processing system 1320 may be the same functional entity as the activity mediation system 1300 or may be a separate functional entity from the activity mediation system 1300. Additional detail regarding an example location comparison engine, such as the location comparison engine 1100 is disclosed in U.S. Patent Application Publication No. 2008/0227471, filed Nov. 1, 2007, titled "System and Method for Automated Analysis Comparing a Wireless Device Location With Another Geographic Location" (as amended) by Dankar et al., which is incorporated by reference herein in its entirety.

FIG. 3 is an example embodiment of the first verification component 108 which is shown as an identity register 2100. One embodiment of the identity register 2100 includes an event processing module 2120, a wireless device location module 2110, a wireless device ID database 2140, an optional identity database 2180, logic resources 2130, and a logic resource configuration 2150.

The event processing module 2120 obtains event data 2310 emanating from some identity authentication event 2330 associated with some identity authentication application. The event processing module 2120 passes the event data 2310 to the wireless device ID database 2140 for storage and use for the generation of a verification value based upon the provided wireless device ID (e.g. MDN) included with the event data 2310. The event processing module 2120 passes the entity's or individual's unique wireless device ID (e.g. MDN) associated with the event data 2310 to the wireless device location module 2110 that is used to obtain the location of a wireless device 2210, such as a mobile telephone, from a wireless network 2200. The wireless device location module 2110 may also obtain wireless device location information from any type of wireless computing device 2220 for which an authentication application may apply.

The wireless device location module 2110 passes the obtained wireless device location associated with the wireless device ID to the wireless device ID database 2140 directly or indirectly via the event processing module 2120. The event processing module 2120, the wireless device ID database 2140 and the optional identity database 2180 provide the appropriate data and parameters associated with the wireless device ID to the logic resources 2130 to generate the first verification value. The data may be provided directly to one or more logic resources 2130 by the respective databases, 2140 and 2180, or via the event processing module 2110.

One or more logic resources 2130 may use configuration data supplied by the logic resource configuration 2150 to properly calculate and generate the first verification value. Once the first verification value is calculated, it is sent directly or indirectly via the event processing module 2120 to a results processing system 2300 that includes the second verification component 110 shown in FIG. 1 in an example embodiment. The results processing system 2300 may then apply the first verification value to some authentication application associated with an identity authentication event 3230 engaged in by an entity, individual or data subject associated with a wireless device 2210 or other wireless computing device 2220. Additional detail regarding an example logic resources component, such as the logic resources 2130 is disclosed in U.S. Patent Application Publication No. 2009/0204457, filed Dec. 11, 2008, titled "System and Method for Mobile Identity Protection of a User of Multiple Computer Applications, Networks or Devices" (as amended) by Buhrmann et al., which is incorporated by reference herein in its entirety.

FIG. 4 is an example embodiment of the first verification component 108 which is shown as a wireless device based user authentication system 3300. One embodiment of the wireless device based user authentication system 3300 of the present invention includes a wireless device 3100, an application requiring secure access associated with a mobile access point 3140, an authentication application 3300 and an optional data network associated with the mobile access point 3200.

The wireless device 3100 communicates with an application requiring secure access associated with the mobile access point 3140 via a local or point-to-point short-range wireless communications mechanism 3120. The wireless device 3100 may optionally communicate with a data network associated with the mobile access point 3200 via a long-range or network-based wireless communications mechanism 3130. When the wireless device 3100 enters into proximity of a mobile access point associated with the application requiring secure access 3140, the wireless device 3100 automatically detects the mobile access point 3140 across the wireless communications mechanism 3120. Alternatively, when the wireless device 3100 enters into proximity of a mobile access point associated with the application requiring secure access 3140, the mobile access point 3140 automatically detects the wireless device 3100 across the wireless communications mechanism 3120. The wireless device 3100 and the mobile access point 3140 establish and maintain a wireless communications connection. Similarly, the wireless device 3100 may optionally communicate with a data network associated with the mobile access point 3200 to enable the authentication application 3300 to obtain the location of the wireless device 3100.

The location of the wireless device 3100 may be used to augment or enhance the verification value provided by the authentication application 3300. The authentication application 3300 includes a transaction processing module 3310, key generation logic resources 3320, a results processing system 3330 and a wireless device ID database 3340, in accordance with the principles of the present invention. The transaction processing module 3310 obtains data regarding an application access event from an application requiring secure access associated with the mobile access point 3140. The transaction processing module 3310 may communicate with the application requiring secure access associated with the mobile access point 3140 either directly or via an optional data network associated with the mobile access point 3200. The transaction processing module 3310 may communicate with the key generation logic resources 3320 to generate authentication key information for a particular wireless device ID (e.g. MDN) during some initial wireless device ID registration process. Alternatively, authentication key information may be downloaded to, previously installed or otherwise transferred to the authentication application 3300 from some other computing device, platform or computer storage and stored in the wireless device ID database 3340. The transaction processing module 3310 may communicate with the wireless device ID database 3340 to provide application access event data for storage such as the application ID representing the application requiring secure access 3140, the location of the application access event and the date and time the location of the application access event was obtained. The transaction processing module 3310 may communicate with the results processing system 3330 to provide application access event data for processing. The application access event data may include the concerned wireless device ID, an application ID representing the application requiring secure access 3140, authentication key information, location of the application access event and the date and time the location of the application access event was obtained, for example. The key generation logic resources 3320 may communicate with the wireless device ID database 3340 to provide generated authentication key information relating to a particular wireless device ID for storage in the wireless device ID database 3340.

The results processing system 3330 generates the first verification value. In an example embodiment, the results processing system 3330 also includes the second verification component 110 shown in FIG. 1, to which the first verification value is passed. The results processing system 3330 may communicate with the wireless device ID database 3340 to provide processed first and/or second verification values for a particular application access event associated with a particular wireless device ID and a particular application ID representing, and associated with, the application requiring secure access 3140. The results processing system 3330 may communicate with the transaction processing module 3310 to provide the first and/or second verification values to the application requiring secure access 3140 either directly or via an optional data network associated with the mobile access point 3200. The application requiring secure access 3140 may then apply the verification values to allow access by the user of the wireless device 3100, deny access to the user of the wireless device 3100 or provide some degree of access to the user of the wireless device 3100. Additional detail regarding an example results processing system, such as the results processing system 3330 is disclosed in U.S. Patent Application Publication No. 2009/0204815, filed Dec. 23, 2008, titled "System and Method for Wireless Device Based User Authentication" by Dennis et al., which is incorporated by reference herein in its entirety.

Figure 5:
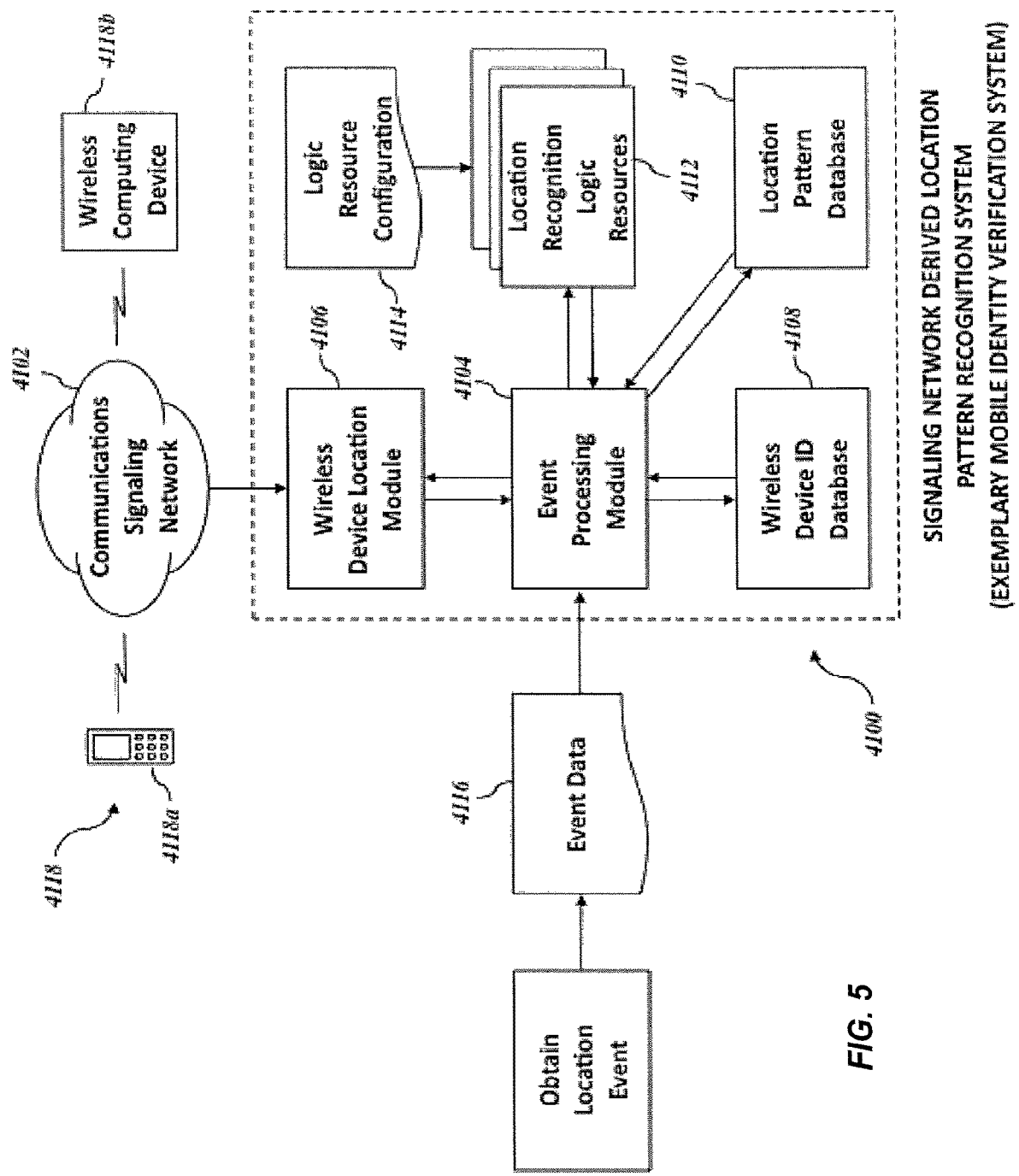
FIG. 5 is a block diagram depicting the functional entities and modules of an exemplary first verification component which is shown as a signaling network derived location pattern recognition system used to calculate and provide a first verification value (i.e. a pattern value)
Figure 6:
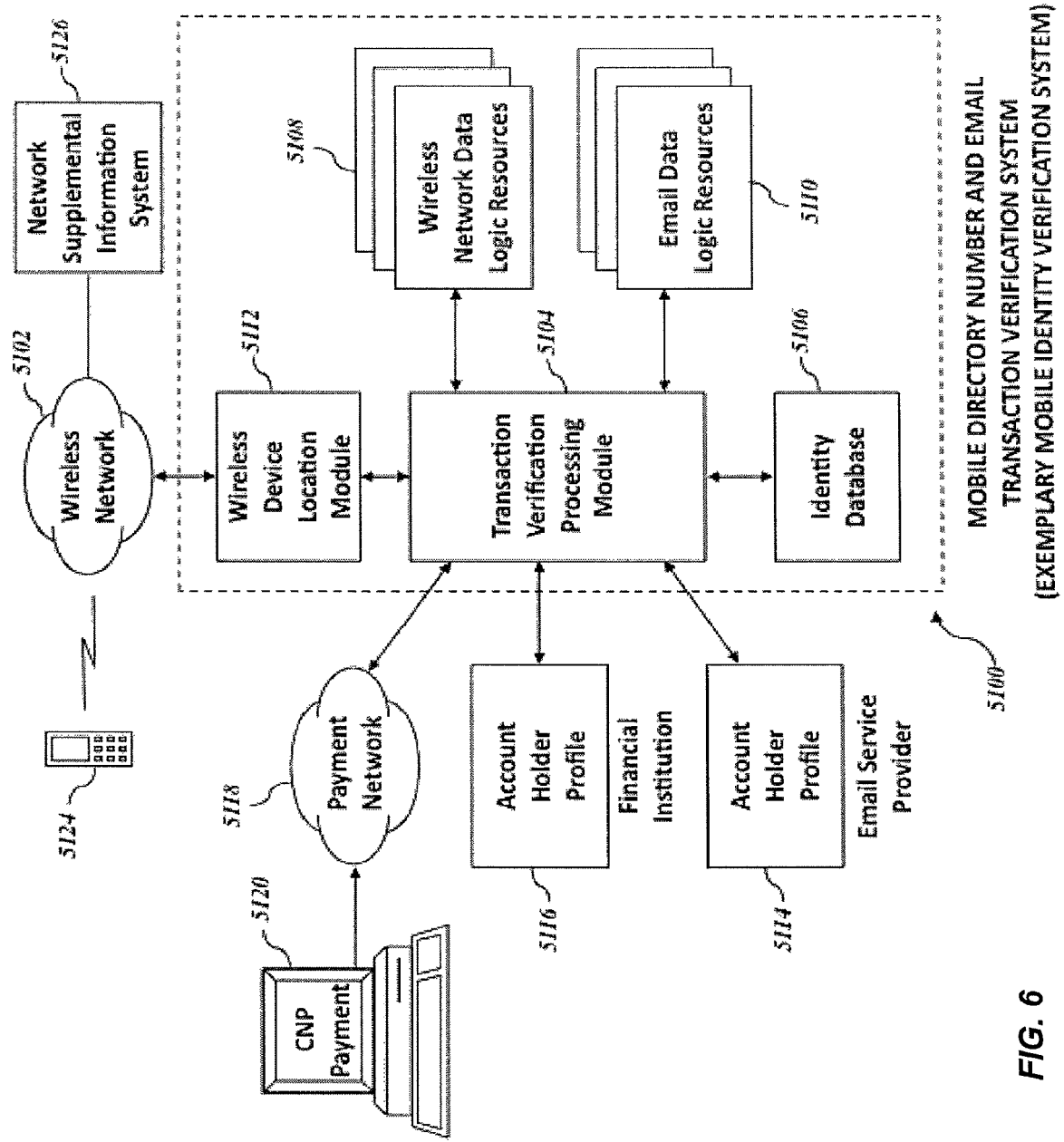
FIG. 6 is a block diagram depicting the functional entities and modules of an exemplary first verification component which is shown as a mobile directory number and email transaction verification system used to calculate and provide a first verification value (i.e. an identity risk value)

FIG. 5 is an example embodiment of the first verification component 108 which is shown as a signaling network derived location pattern recognition system 4100. One embodiment of the signaling network derived location pattern recognition system 4100 is used in a process of authenticating electronic activity of interest for an automated transaction where one or more locations of a user of a wireless device 4118 that are derived from a communications signaling network 4102 are incorporated into location recognition logic resources 4112 to generate the first verification value (i.e. a pattern value) that can indicate a likelihood that the automated electronic activity, such as a particular transaction engaged in, is fraudulent. The signaling network derived location pattern recognition system 4100 can be used with any type of electronic activity, such as an automated transaction. Two non-limiting example types of electronic activities of interest automated transactions are card-not-present (CNP) and card present (CP) financial transactions.

An automatic transaction location event can be triggered by various types of applications. For example in an alternate embodiment, a consumer desiring to make a purchase when they are not present at a retailer can initiate a card-not-present (CNP) transaction by using a computer network such as the Internet. The consumer can enter payment information such as a credit card number, the consumer's wireless device ID (e.g. MDN) and the consumer's name and address using an input device in signal communication with a computer used by the consumer. The payment information can then be transmitted to a computerized payment processing system of a payment processor such as a bank.

The payment processing system can generate a location event by sending event data 4116 that includes the consumer's MDN to the signaling network derived location pattern recognition system 4100. The signaling network derived location pattern recognition system 4100 receives the event data 4116 through the communications interface. A processor (not shown) configured to implement the functions of an event processing module 4104 and a wireless device location module 4106 requests information pertaining to a device associated with the consumer's MDN from the communications signaling network 4102. This information may include the device location, for example. The processor generates location pattern information based on at least one of a logic resource configuration 4114, location recognition logic resources 4112, a location pattern database 4110, and a wireless device ID database 4108. In an example embodiment, the location pattern information generated by the processor includes the first verification value and the processor is further configured to generate the second verification value as described with respect to the second verification component 110 shown in FIG. 1. The processor then sends a response including the first and/or second verification value based on the location pattern information back to the payment processing system.

The payment processing system, based upon the received information provided by the signaling network derived location pattern recognition system 4100, generates an acceptance decision based on the response and, in some cases, other predetermined criteria. If the acceptance decision is positive, the payment processing system allows the transaction to proceed and the consumer is notified that the transaction went through, such as by displaying a confirmation number on a display device in signal communication with the computer used by the consumer. If the acceptance decision is negative, the payment processing system does not allow the transaction to proceed and notifies the consumer in a similar manner. Additional detail regarding an example location recognition logic resources component such as the location recognition logic resources 4112 is disclosed in U.S. Patent Application Publication No. 2010/0130165, filed Nov. 30, 2009, titled "System and Method for Signaling Network Derived Location Pattern Recognition" by Ferguson et al., which is incorporated by reference herein in its entirety.

FIG. 6 is an example embodiment of the first verification component 108 which is shown as a mobile directory number and email transaction verification system 5100. One embodiment of a mobile directory number and email transaction verification system 5100 is used to verify financial transactions based on a mobile directory number (MDN) received from one of a payment network 5118, an account holder profile from a financial institution 5116 or both. Similarly, the mobile directory number and email transaction verification system 5100 may be used to verify financial transactions based on an email address, IP address data or both received from one of a payment network 5118, an account holder profile from a financial institution 5116 or both. The example depicts a transaction verification processing module 5104, a wireless device location module 5112, an identity database 5106, one or more wireless network data logic resources 5108 and one or more email data logic resources 5110 in accordance with the principles of the present invention.

The wireless device location module 5112 supports communications used to receive, or request and receive, location data and supplementary wireless network data, such as wireless device subscription data associated with a particular wireless device, from the wireless network 5102. The transaction verification processing module 5104 receives financial transaction data from a payment network 5118 that may be associated with a financial transaction made by an account holder. The transaction verification processing module 5104 also receives account number data and optionally one or more of mobile directory number (MDN) data, email address data and IP address data associated with the account holder making the financial transaction. The account number data, MDN data, email address data and IP address data may be provided to the payment network 5118 in a variety of ways. The account number data, MDN data and email address data may be provided directly by an account holder, for example, into an Internet website form 5120 while making a purchase for a product or service. This same data may also be provided indirectly by an online merchant during the purchase process that may, for example, be stored by the online merchant as part of the account holder's registered account profile. Additionally, IP address data may be provided, for example, directly by an online merchant which may be obtained from a computer associated with an online Internet session with the online merchant.

The transaction verification processing module 5104 receives the account number data, optional MDN data, optional email address data and optional IP address data pertaining to a financial transaction and passes this data to the identity database 5106. This data pertaining to an account holder making the financial transaction may or may not have been previously stored in the identity database 5106. The identity database 5106 stores the received data for use in the financial transaction verification process. The transaction verification processing module 5104 sends the received account number data pertaining to the financial transaction to the financial institution 5116, along with a request for additional account profile data associated with the account holder. The financial institution 5116 maintains an account profile for the account number associated with an account holder making the financial transaction. The additional account profile data requested from the financial institution account holder profile 5116 may include one or more of the previously stored account holder's MDN, other phone numbers associated with the account (such as additional mobile, home or business phone numbers) and one or more email addresses. The financial institution 5116 responds to this request for data by sending one or more of the previously stored account holder's MDN, other phone numbers associated with the account and one or more email addresses. When the transaction verification processing module 5104 receives this additional account profile data, it passes the data to the identity database 5106 for storage and use for the financial transaction verification process.

A first embodiment of the mobile directory number and email transaction verification system 5100 may be based upon a query-response communication mechanism between the mobile directory number and email transaction verification system 5100 and a payment network 5118 that requests validation of the MDN supplied and associated with the financial transaction. If an MDN associated with the financial transaction is obtained via the payment network 5118 and an MDN associated with the financial account associated with the financial transaction is obtained via the financial institution account holder profile 5116, the obtained MDNs may be analyzed and compared. This analysis and comparison may be performed by the transaction verification processing module 104 itself or another module within the mobile directory number and email transaction verification system 5100. The financial transaction may be verified if the verification value (i.e. result) of the analysis and comparison reveals that received MDNs are identical. The verification value that is determined as a result of the analysis and comparison is the first verification value and is passed to the second verification component 110 for further processing in an example embodiment. If the obtained MDNs are not identical, an indication that the financial transaction was performed by an individual other than the actual account holder may be deduced. At this point, an indication that the financial transaction is either verified or not verified may be passed to the payment network 5118, which may or may not result in the financial transaction being either authorized or declined.

Furthermore, the mobile directory number and email transaction verification system 5100 may be based upon a query-response communication mechanism between the mobile directory number and email transaction verification system 5100 and a payment network 5118 that requests validation of an email address supplied and associated with a financial transaction. If an email address associated with the financial transaction is obtained via the payment network 5118 and an email address associated with the financial account associated with the financial transaction is obtained via the financial institution account holder profile 5116, the obtained email addresses may be analyzed and compared. This analysis and comparison may be performed by the transaction verification processing module 5104 itself or another module within the mobile directory number and email transaction verification system 5100 without deviating from the principles of the present invention. The financial transaction may be verified if the verification value (i.e. result) of the analysis and comparison reveals that received email addresses are identical. If the obtained email addresses are not identical, an indication that the financial transaction was performed by an individual other than the actual account holder may be deduced. The verification value that is determined as a result of the analysis and comparison is the first verification value and is passed to the second verification component 110 for further processing in an example embodiment. At this point, an indication that the financial transaction is either verified or not verified may be passed to the payment network 5118, which may or may not result in the financial transaction being either authorized or declined.

An alternate embodiment may be characterized by the addition of wireless network location data and wireless network supplementary subscription data obtained from the wireless network 5102, other telephone directory number data associated with an MDN of an account holder obtained from a financial institution account holder profile 5116 and IP address data obtained from an email service provider account holder profile 5114 as part of the mobile directory number and email transaction verification system 5100. The alternate embodiment uses connectivity to the wireless network 5102 serving the wireless device 5124 associated with an MDN and/or connectivity to the email service provider 5114 associated with an email address. The alternate embodiment has the benefit of adding value to the mobile directory number and email transaction verification system 5100 for the verification and analysis of an MDN and/or email address associated with a financial transaction provided in the first embodiment.

In an alternate embodiment, once data has been received by the payment network 5118 pertaining to a particular financial transaction and also received by the financial institution account holder profile as described with respect to the first embodiment of the mobile directory number and email transaction verification system 5100, a request may be made to the wireless network 5102 for location data and supplementary subscription data for the provided MDN. This request may be made, for example, by the transaction verification processing module 5104 via the wireless device location module 5112 using the MDN obtained from the payment network 5118 or the financial institution account holder profile 5116, for example. The transaction verification processing module 5104 passes the wireless device ID (e.g. the MDN) associated with a financial transaction to the wireless device location module 5112 that is used to obtain the location of the wireless device 5124, and optionally supplementary data associated with a wireless network subscription associated with the wireless device 5124, from the wireless network 5102. The wireless device location module 5112 requests wireless device location data and wireless network supplementary subscription data from the wireless network 5102. The wireless network 5102 may obtain this data from a network supplemental information system 5126, for example. The wireless network 5102 responds to the request from the wireless device location module 5112 for wireless device location data and wireless network supplementary subscription data. Wireless device location data provided from the wireless network 5102 may include current or last known location data pertaining to the wireless device 5124.

Once data has been received by the payment network 5118 pertaining to a particular financial transaction and also received by the financial institution account holder profile as described in the first embodiment of the mobile directory number and email transaction verification system 5100, a request may be made to the email service provider 5114 for historical IP address data for the provided email address. This request may be made by the transaction verification processing module 5104 using the email address obtained from the payment network 5118 or the financial institution account holder profile 5116, for example. The transaction verification processing module 5104 passes the email address associated with the financial transaction to the email service provider 5114 to request historical IP address data from the email service provider 5114. The email service provider 5114 may obtain this data from the account holder profile associated with the email address, for example. The email service provider 5114 responds to the request from the transaction verification processing module 5104 with IP address data associated with the provided email address. IP address data provided from the email service provider may include previous IP addresses from which the email account associated with the provided email address was accessed and the date and time associated with the IP address from which the email account was accessed.

When the wireless device location data, wireless network supplementary subscription data and other directory numbers associated with the account holder are obtained, the wireless device location module 5112 passes the wireless device location data and wireless network supplementary subscription data associated with the MDN to the identity database 5106 directly or indirectly via the transaction verification processing module 5104 for storage and use for the financial transaction verification process. Geographic location data derived from the format of the obtained directory numbers are also passed to the identity database 5106 for storage and use for the financial transaction verification process.

Similarly, when the appropriate IP address data are received from the email service provider 5114 pertaining to the email address associated with the financial transaction and associated with the account holder, the transaction verification processing module 5104 passes the obtained IP address data and email address data associated with the email address to the identity database 5106, directly or indirectly, for storage and use for the financial transaction verification process.

The transaction verification processing module 5104 and the identity database 5106 provide the appropriate data and parameters associated with the MDN to the wireless network data logic resources 5108 to determine the first verification value (e.g. an identity risk value). The first verification value is associated with the financial transaction and an individual associated with the financial transaction represented by the MDN. Similarly, the transaction verification processing module 5104 and the identity database 5106 provide the appropriate data and parameters associated with the email address to the email data logic resources 5110 to determine the first verification value (e.g. an identity risk value). In this case, the first verification value is associated with the financial transaction and an individual associated with the financial transaction represented by the email address. The first verification value, whether determined by the email data logic resources 5110 or the wireless network data logic resources 5108, is then passed to the second verification component 110 shown in FIG. 1.

Additional detail regarding example wireless network data logic resources and email data logic resources is disclosed in International Application Ser. No. PCT/US10/41264, filed Jul. 7, 2010, titled "Mobile Directory Number and Email Verification of Financial Transactions" by Snyder et al., which is incorporated by reference herein in its entirety.

Figure 7:
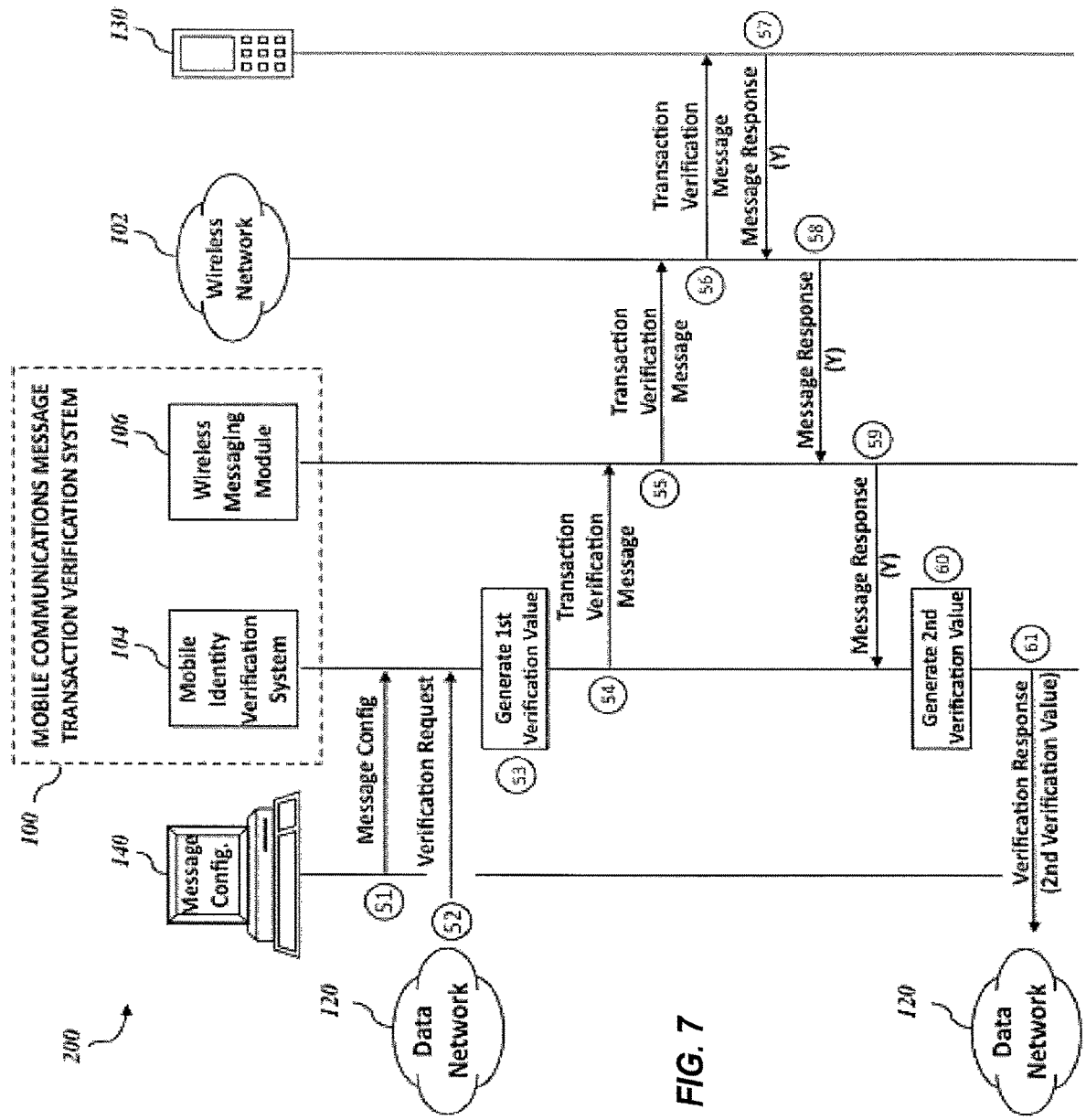
FIGS. 7-8 are exemplary detailed flow diagrams of the mobile communications message transaction verification system.

FIG. 7 depicts an exemplary information and system flow diagram 200 representing the operation of the mobile communications message transaction verification system 100, in accordance with one embodiment of the present invention. In this exemplary information and system flow, a secure transaction event occurs. One non-limiting example of a secure transaction event is an automated electronic financial transaction associated with some purchase of goods or services, resulting in transaction verification event data being sent to the data network 120 and being received by the transaction verification system 100.

At a step 51, transaction verification message criteria are electronically configured at the transaction verification system 100. In one exemplary embodiment, the message criteria are configured within the mobile identity verification system 104.

At a step 52, a secure transaction event occurs resulting in transaction verification event data 150 being received by the mobile identity verification system 104 of the mobile communications message transaction verification system 100. Transaction verification event data such as a location of the secure event and a wireless device ID (e.g. MDN), for example, may be sent autonomously or requested based on some other interaction between the transaction verification system 100 and the data network 120 or other processing system.

At a step 53, the first verification component 108 of the mobile identity verification system 104 generates and stores a first verification value for the transaction based on transaction verification event data received from the data network 120 and other parameters received and processed in accordance with the embodiments of the present invention.

At a step 54, if the transaction verification message criteria based on the previous message configuration are met, the mobile identity verification system 104 sends a transaction verification message to the wireless messaging module 106 for subsequent delivery to the wireless device 130 identified by the wireless device ID (e.g. MDN).

At a step 55, the wireless messaging module 106 sends the transaction verification message (e.g. an electronic mobile message) to the appropriate wireless network 102 serving the wireless device 130.

At a step 56, the wireless network 102 sends the transaction verification message (e.g. an electronic mobile message) to the appropriate wireless device 130 associated with the wireless device ID (e.g. MDN).

At a step 57, when the wireless device 130 receives the transaction verification message indicating that a secure transaction event has occurred, a response message may be sent from the wireless device 130 either confirming or not confirming that the secure transaction event is legitimate. In this case, the message response (e.g. Y for "yes") indicates that the secure transaction is confirmed as legitimate. The message response is sent to the wireless network 102 for subsequent delivery to the mobile communications message transaction verification system 100.

At a step 58, the wireless network 102 serving the wireless device 130 sends the message response to the wireless messaging module 106 of the mobile communications message transaction verification system 100.

At a step 59, the wireless messaging module 106 passes the message response to the mobile identity verification system 104.

At a step 60, based on the message response, in this case a confirmation that the secure transaction is legitimate, the second verification component 110 of the mobile identity verification system 104 generates and stores a second verification value.

At a step 61, the mobile identity verification system 104 passes the second verification value to the data network 120 or other processing system for the corresponding secure transaction for which a verification value was originally requested (step 52). This includes transmitting the second verification value to the transaction processor 144 as transaction verification results data 160 in an example embodiment.

Figure 8:
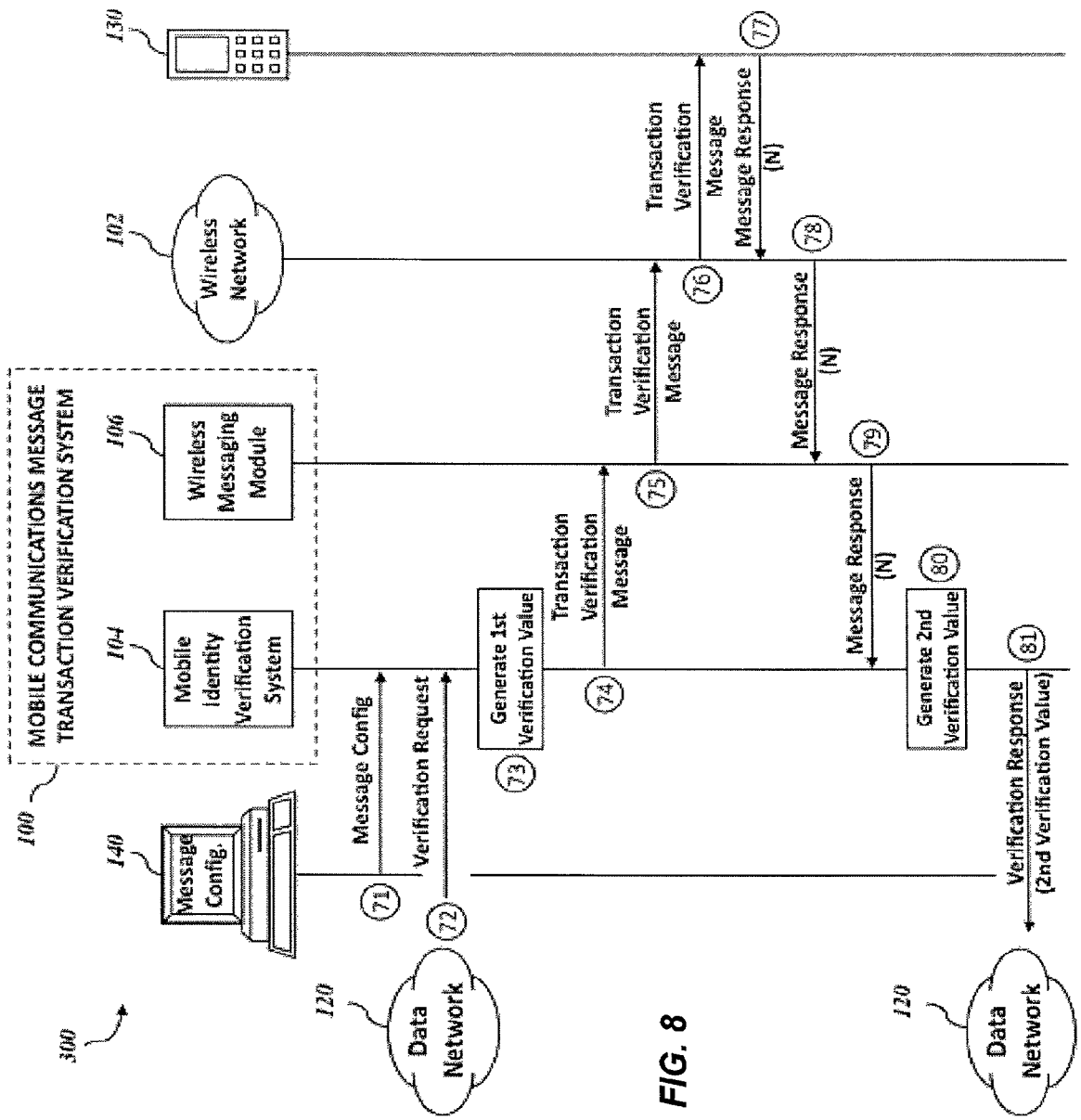

FIG. 8 depicts an exemplary information and system flow diagram 200 representing the operation of the transaction verification system 100 in accordance with an example embodiment. In this exemplary information and system flow, a secure transaction event occurs. One non-limiting example of a secure transaction event is an automated electronic financial transaction associated with some purchase of goods or services, resulting in transaction verification event data being sent to a data network 120 and being received by the transaction verification system 100.

At a step 71, transaction verification message criteria are electronically configured at the mobile communications message transaction verification system 100. In one exemplary embodiment, the message criteria are configured within the mobile identity verification system 104.

At a step 72, a secure transaction event occurs resulting in transaction verification event data 150 being received by the mobile identity verification system 104 of the mobile communications message transaction verification system 100. Transaction verification event data such as a location of the secure event and a wireless device ID (e.g. MDN), for example, may be sent autonomously or requested based on some other interaction between the mobile communications message transaction verification system 100 and a data network 120 or other processing system.

At a step 73, the first verification component 108 of the mobile identity verification system 104 generates and stores a first verification value for the transaction based on transaction verification event data received from the data network 120 and other parameters received and processed in accordance with the embodiments of the present invention.

At a step 74, if the transaction verification message criteria based on the previous message configuration are met, the mobile identity verification system 104 sends a transaction verification message to the wireless messaging module 106 for subsequent delivery to the wireless device 130 identified by the wireless device ID (e.g. MDN).

At a step 75, the wireless messaging module 106 sends the transaction verification message (e.g. an electronic mobile message) to the appropriate wireless network 102 serving the wireless device 130.

At a step 76, the wireless network 102 sends the transaction verification message (e.g. an electronic mobile message) to the appropriate wireless device 130 associated with the wireless device ID (e.g. MDN).

At a step 77, when the wireless device 130 receives the transaction verification message indicating that a secure transaction event has occurred, a response message may be sent from the wireless device 130 either confirming or not confirming that the secure transaction event is legitimate. In this case, the message response (e.g. N for "no") indicates that the secure transaction is not legitimate. The message response is sent to the wireless network 102 for subsequent delivery to the mobile communications message transaction verification system 100.

At a step 78, the wireless network 102 serving the wireless device 130 sends the message response to the wireless messaging module 106 of the transaction verification system 100.

At a step 79, the wireless messaging module 106 passes the message response to the mobile identity verification system 104.

At a step 80, based on the message response, in this case an indication that the secure transaction is not legitimate, the second verification component 110 of the mobile identity verification system 104 generates and stores a second verification value.

At a step 81, the mobile identity verification system 104 passes the second verification value to the data network 120 or other processing system for the corresponding secure transaction for which a verification value was originally requested (step 72). This includes transmitting the second verification value to the transaction processor 144 as transaction verification results data 160 in an example embodiment.

In the various embodiments, a first and a second verification value is developed. The verification values are non-dimensional numerical values corresponding to a probability that a secure transaction of interest is fraudulent. In an example embodiment, the verification values fall within a predefined numerical range. For example, the verification value range may be from one to nine hundred ninety-nine (1-999) where a low verification value may indicate that the secure transaction of interest is likely not fraudulent, and a high verification value may indicate that the secure transaction of interest is likely to be fraudulent (or vice versa). Furthermore, the verification value may be a binary value that may simply indicate that a secure transaction of interest is more likely fraudulent than not (or vice versa). Any suitable verification value range may be used to define the relative probability of a determined verification value.

Statistical correlation methods and processes of generating verification values are well known in the arts. Verification values were originally developed for use by financial services firms to measure the fraud risk for new customers opening accounts. Typical external credit and fraud checks often fail to detect erroneous background information. The use of verification values is used for verifying the legitimacy of an individual's identity engaging in a secure transaction.

Embodiments of the mobile communications message transaction verification system 100 generate the first and/or second verification value using statistical correlation processes and methods. The wireless network and telecommunications data and information relative to the secure transaction of interest are statistically analyzed such that the first and/or second verification value is generated, thereby indicating a value that is indicative of the probability that the secure transaction of interest is fraudulent or valid. Any suitable statistical correlation process and/or method may be used to determine the first and/or second verification value, and is not described herein in greater detail for brevity.

FIG. 9 is a flow chart of a method 400 describing operation of an exemplary embodiment of the transaction verification system 100. The method 400 shows the architecture, functionality, and operation of a possible implementation of the software for implementing the transaction verification system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 9, may include additional functions, and/or may omit some functions. For example, two blocks shown in succession in FIG. 9 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

The process of FIG. 9 starts at a block 402. At a block 404, transaction verification messaging variables are configured. These variables are used to determine for which criteria a transaction verification message is sent to one or more wireless devices.

At a block 406, a transaction verification request that pertains to a secure transaction verification event 150 is received at the mobile communications message transaction verification system 100 from the data network 120. The transaction verification request includes appropriate event data associated with a wireless device 130, such as a wireless device ID (e.g. MDN) used to identify an individual associated with the secure transaction of interest and data pertaining to the location or source of the transaction of interest.

At a block 408, a first verification value is generated by the first verification component 108 based on the data received from the transaction verification request from the data network 120 and other data obtained and processed by the mobile identity verification system 104.

At a block 410, if transaction verification message criteria are met as configured in step 404, a transaction verification message is sent to the wireless device ID associated with wireless device 130 that pertains to the secure transaction of interest associated with the transaction verification event data 150. A response to the transaction verification message from the wireless device 130 is then received at the transaction verification system 100.

At a block 412, based on the message response to the transaction verification message from the wireless device 130, a new second verification value is generated by the second verification component 110. This second verification value can then be passed to the transaction processor 144 as transaction verification results data 160 so action can be taken such as approval of the transaction, denial of the transaction, or display of the second verification value for example. The process of FIG. 9 ends at block 414.

The newly generated second verification value is indicative of whether or not a particular secure transaction of interest that is associated with the wireless device 130 is likely to be fraudulent or valid. Since the identity of the individual attempting to complete a secure transaction of interest can be associated with the wireless device 130, then the second verification value is indicative of the likelihood of fraud by the individual attempting to complete the secure transaction of interest.

For example, an individual associated with the wireless device 130 may be attempting to conduct a secure financial transaction, such as a purchase using a credit card or debit card. The generated second verification value would give an indication whether or not the transaction is likely to be valid when the obtained wireless device location data tend to indicate that the individual attempting to conduct the transaction of interest is the same individual that is associated with the wireless device 130.

In an exemplary embodiment, the location data obtained by the transaction verification system 100 pertaining to an MDN (e.g. wireless device 130 location data) along with location data pertaining to where a secure transaction has occurred may be used to perform a statistical correlation among these location data to determine irregular or anomalous locations relating to an individual associated with a secure transaction of interest. To provide a further and more accurate assessment of the validity or legitimacy of a secure transaction, a transaction verification message may be sent from the transaction verification system 100 to the wireless device 130. The transaction verification message may be used to request confirmation that the secure transaction of interest is, in fact, valid and legitimate. The response to the transaction verification message sent from the wireless device 130 to the transaction verification system 100 may provide additional data used to perform a statistical correlation to determine the validity of the secure transaction of interest. A new second verification value may be generated based on whether the secure transaction has been confirmed via the message response to the transaction verification message. The second verification value may be different from the original first verification value that was generated prior to the sending of the transaction verification message.

As a non-limiting example, for a particular wireless device ID (e.g. MDN) associated with a secure transaction, obtained wireless location data and secure transaction location data may be associated, respectively, with geographic areas around City A and City B. Furthermore, City A may be separated from City B by some large distance, for example, 1000 miles. Obtained wireless device 130 location data may be near City A. Obtained secure transaction event location data may be near City B, implying that an individual associated with a secure transaction is far from where the wireless device 130 (e.g. mobile phone) resides. If it is assumed that the wireless device is typically close in proximity to where the individual who owns the wireless device is, the individual is assumed to be near City A when a secure transaction occurs by the same purported individual at City B. Based on this scenario, the first verification component 108 of the mobile identity verification system 104 may generate a first verification value indicating that the secure transaction is not legitimate. However, there may be many circumstances such that the secure transaction is legitimate. One non-limiting example may be that the wireless device 130 is actually in the area around City A and the secure transaction is being performed by a legitimate individual in the area around City B, such as a relative or friend of the owner of the wireless device 130. This may cause the originally generated verification value to indicate that the secure transaction of interest is not legitimate, when in fact, it is legitimate. In this example, a transaction verification message may be sent to the wireless device 130 from the transaction verification system 100 requesting confirmation of the secure transaction. The actual owner of the wireless device 130 that may be near or around City A may reply to the transaction verification message with a confirmation that the transaction is, in fact, legitimate. The transaction verification system 100 receives this affirmative response to the message and can generate a new second verification value that indicates the secure transaction of interest is legitimate. For example, if the original first verification value was 950 as generated in the example discussed above and indicating a high probability that the transaction is not legitimate, the second verification component 110 of the mobile identity verification system 104 would re-evaluate the transaction and generate a new second verification value of 25 to indicate a lesser likelihood that the transaction is not legitimate after the message response is received. Verification value re-evaluation logic may be simple in some embodiments, such as adding or subtracting a predetermined value from the initial first verification value based on the transaction verification message response up to predetermined minimum or maximum value levels. Verification value re-evaluation logic may be more complex in other embodiments, such as the use of various logic resources and results processing systems in the described exemplary embodiments of the mobile identity verification system 104.

The above-described wireless device 130 location indicia, secure transaction location indicia and transaction verification message response indicia from the wireless device 130 obtained by the transaction verification system 100 in response to a request for information from embodiments of the transaction verification system 100 are used to determine the new second verification value using a suitable statistical correlation process and/or method. Embodiments may determine the first and/or second verification value using one or more of the above-described indicia. Weighting may be used to adjust the relevance of particular indicia when the first and/or second verification value is determined. Embodiments may selectively pick available indicia for consideration when the first and/or second verification value is determined.

Figure 10:
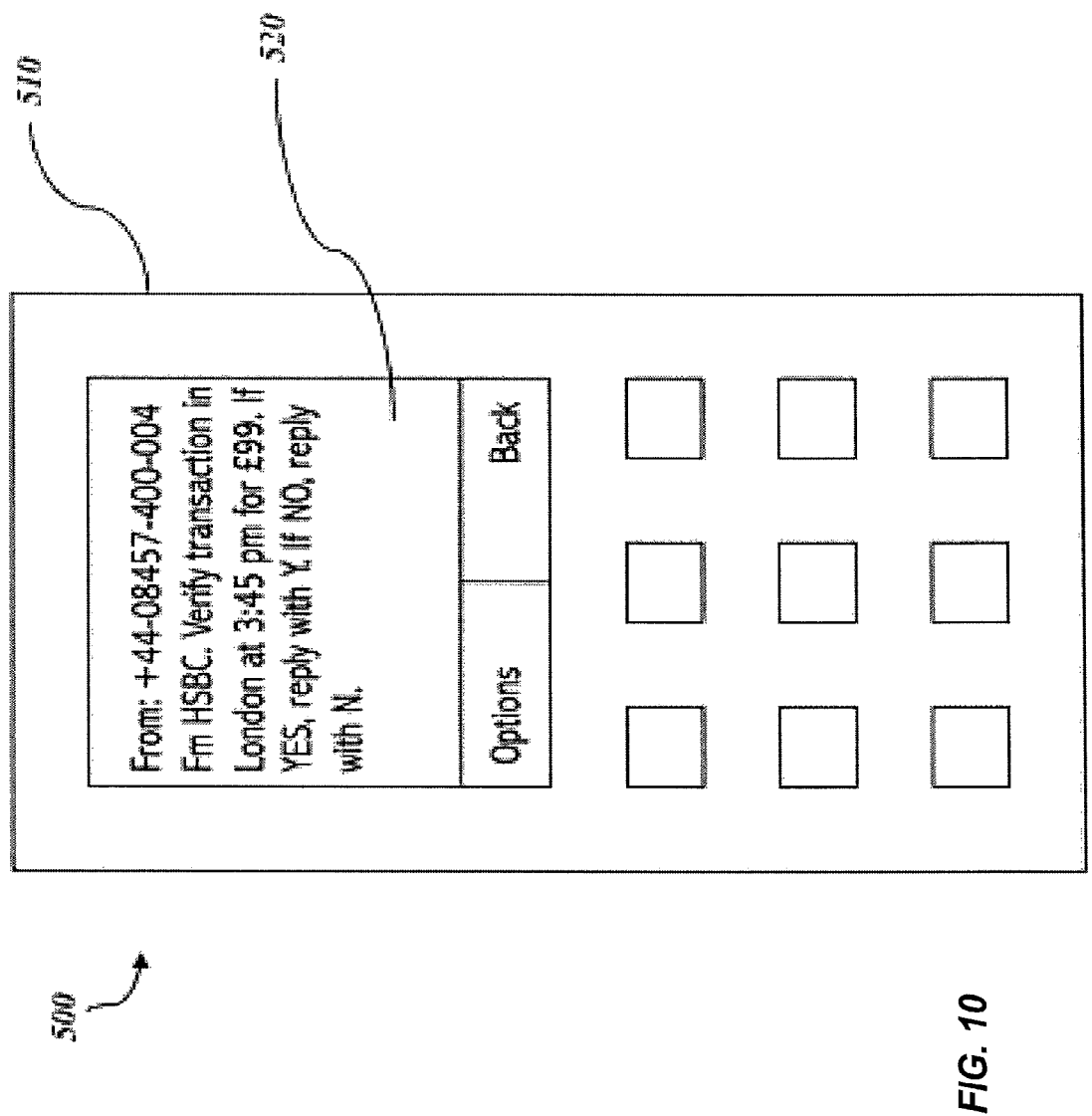
FIG. 10 depicts an exemplary transaction verification message received on a wireless device.

FIG. 10 depicts an exemplary transaction verification message 520 received as a short message service (SMS) message on a mobile phone 510 representing a typical wireless device such as the wireless device 130 shown in FIG. 1, for example. The transaction verification message includes information relating to the transaction to be verified. In an example embodiment, the message includes a number from which the message was sent, a name of the sender, such as the name of a transaction processor associated with transaction verification event data 150, a location of the transaction, a time of the transaction, a transaction amount, and instructions for responding to the message. For example, the transaction verification message 520 may prompt the user to respond to the message affirmatively, for example responding with "Y" if the transaction referred to in the message is legitimate or to respond to the message negatively, for example "N" if the transaction referred to in the message is not legitimate.

The transaction verification system 100 may be configured by the message configuration computerized device 140 to manage different message response types from users of the wireless device 130. In an example embodiment, the transaction verification system 100 may check the first character of the message response only, categorizing a "Y" or a "y" as a positive response and an "N" or an "n" as a negative response. The transaction verification system 100 may also be configured to manage irregular or unexpected responses such as a late message response greater than some predefined timeout period or a lack of message response. In cases of a late message response or lack of message response, the re-evaluation of a new second verification value may proceed as though the response were an "N" in an example embodiment, but may proceed with re-evaluation logic that uses a third neutral category in some embodiments.

Figure 11:
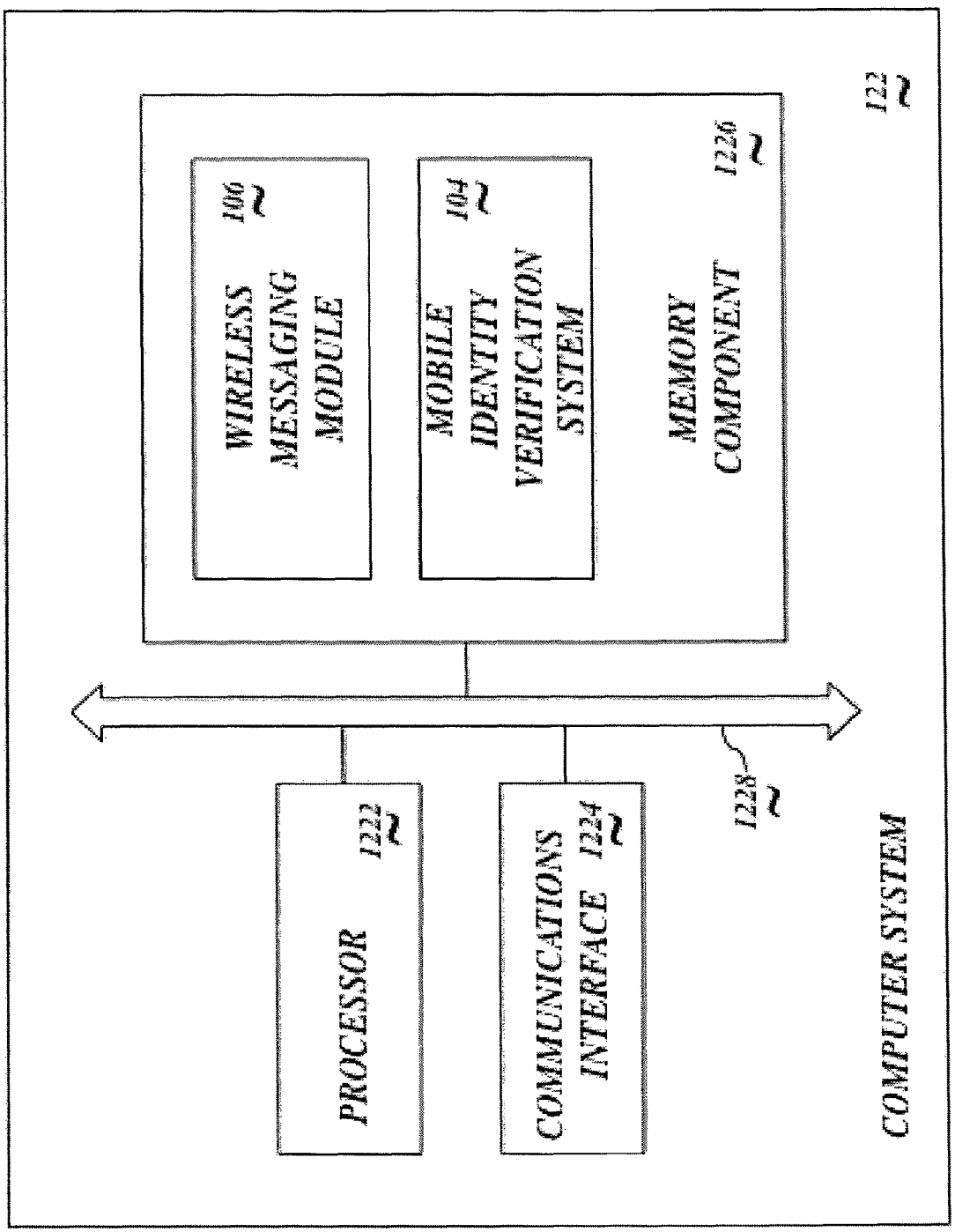
FIG. 11 is a block diagram depicting computer system components of an exemplary mobile communications message transaction verification system including a computer processor, communications interface and memory components where the exemplary functional entities and modules of the mobile communications message transaction verification system reside in an example embodiment.

FIG. 11 depicts an exemplary computer system 122 of an embodiment of the transaction verification system 100. The computer system 122 includes at least one processor 1222, at least one memory component 1226 in signal communication with the processor 1222, and at least one communications interface 1224 in signal communication with the processor 1222. The processor 1222, the memory component 1226, and the communications interface 1224 are communicatively coupled to a communication bus 1228, thereby providing connectivity between the above-described components. In alternative embodiments of the transaction verification system 100, the above-described components may be communicatively coupled to each other in a different manner. For example, one or more of the above-described components may be directly coupled to the processor 1222, or may be coupled to the processor 1222 via intermediary components (not shown). Further, additional components (not shown) may be included in alternative embodiments of the transaction verification system 100.

The memory component 1226 may be any suitable memory device or system. Depending upon the embodiment, the memory component 1226 may be a dedicated memory system, may be part of another component or system, and/or may be a distributed memory system. The memory component 1226 may also include other logic, modules and/or databases not illustrated or described herein.

In the context of this disclosure, the memory component 1226 is a computer-readable medium that is an electronic, magnetic, optical, or other another physical device or means that contains or stores a computer and/or processor program. The computer-readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic is printed, as the program can be electronically captured, via for instance optical scanning of the paper or other medium, then compiled, interpreted, or otherwise processed in a suitable manner, if necessary, and then stored in memory component 1226.

The communications interface 1224 is illustrated and described herein as a single component that is configured to communicate with the wireless network 102. Additionally, the communications interface 1224 is illustrated and described as being configured to communicate with the data network 120 that provides a request for information pertaining to the likelihood that a transaction of interest is valid.

It is appreciated that the communications interface 1224 may be comprised of a plurality of communication devices that act in cooperation so that embodiments of the mobile communications message transaction verification system 100 are able to access the various entities described herein. Further, the wireless network 102 and the data network 120 associated with the wireless device 130 may be different types of systems. Accordingly, the various communication devices of the communications interface 1224 may be different from each other so as to support communications over a variety of different networks that may be using different communication formats.

Embodiments of the transaction verification system 100 are configured to concurrently process a plurality of requests to verify that a plurality of different transactions of interest are valid. The plurality of requests may originate from the same data network 120. That is, it is likely that a large data network 120, such as a bank or credit card company, will be concurrently conducting many different transactions of interest with different customers. Further, embodiments of the transaction verification system 100 may be configured to concurrently process the plurality of communications requests and responses for information from many different systems. That is, embodiments are configured to concurrently request and respond from/to different systems, such as multiple data networks 120 and multiple wireless networks 102.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
receiving a transaction verification message at a wireless device associated with a wireless device ID from a mobile identity verification system, when a first verification value meets predetermined criterion, wherein the transaction verification message is not sent to the wireless device when the first verification value does not meet the predetermined criterion, and wherein the first verification value is generated by evaluating a transaction based on the wireless device ID and a transaction location of the transaction; and
transmitting, by the wireless device to the mobile identity verification system, a message response confirming authorization of the transaction, wherein the mobile identity verification system re-evaluates the transaction based on the message response, thereby generating a second verification value based at least in part on the first verification value and the message response, wherein the second verification value is statistically determined and indicates a second probability that the transaction is fraudulent, wherein generating the second verification value includes adding or subtracting a predetermined value with respect to the first verification value, and wherein the mobile identity verification system electronically sends the second verification value to a transaction processor, the transaction processor performing an action based on the second verification value.

2. The method of claim 1, wherein the transaction verification message is a short message service (SMS) message.

3. The method of claim 1, wherein the transaction verification message is an email message.

4. The method of claim 1, further comprising:
receiving a manual input from a user prior to transmitting.

5. The method of claim 1, wherein the action performed using the second verification value approves the transaction.

6. The method of claim 1, wherein the action performed using the second verification value rejects the transaction.

7. The method of claim 1, wherein the transaction verification message includes the transaction location of the transaction.

8. The method of claim 1, wherein the transaction verification message includes a transaction amount.

9. The method of claim 1, wherein the transaction verification message includes an identification of the transaction processor associated with the transaction, the transaction location of the transaction, a transaction amount, and instructions for responding to the transaction verification message.

10. A wireless device comprising:
a processor; and
a non-transitory computer readable medium coupled to the processor, the computer readable medium comprising code, executable by the processor for implementing a method comprising
receiving a transaction verification message at a wireless device associated with a wireless device ID from a mobile identity verification system, when a first verification value meets predetermined criterion, wherein the transaction verification message is not sent to the wireless device when the first verification value does not meet the predetermined criterion, and wherein the first verification value is generated by evaluating a transaction based on the wireless device ID and a transaction location of the transaction, and transmitting, by the wireless device to the mobile identity verification system, a message response confirming authorization of the transaction, wherein the mobile identity verification system re-evaluates the transaction based on the message response, thereby generating a second verification value based at least in part on the first verification value and the message response, wherein the second verification value is statistically determined and indicates a second probability that the transaction is fraudulent, wherein generating the second verification value includes adding or subtracting a predetermined value with respect to the first verification value, and wherein the mobile identity verification system electronically sends the second verification value to a transaction processor, the transaction processor performing an action based on the second verification value.

11. The wireless device of claim 10, wherein the transaction verification message is a short message service (SMS) message.

12. The wireless device of claim 10, wherein the transaction verification message is an email message.

13. The wireless device of claim 10, wherein the method further comprises:
receiving a manual input from a user prior to transmitting.

14. The wireless device of claim 10, wherein the action performed using the second verification value approves the transaction.

15. The wireless device of claim 10, wherein the action performed using the second verification value rejects the transaction.

16. The wireless device of claim 10, wherein the transaction verification message includes the transaction location of the transaction.

17. The wireless device of claim 10, wherein the transaction verification message includes a transaction amount.

18. The wireless device of claim 10, wherein the transaction verification message includes an identification of the transaction processor associated with the transaction, the transaction location of the transaction, a transaction amount, and instructions for responding to the transaction verification message.

* * * * *